United States Patent
Kondo

(10) Patent No.: US 7,398,848 B2
(45) Date of Patent: Jul. 15, 2008

(54) BATTERY STOPPER FOR FORKLIFT TRUCK

(75) Inventor: Hidehito Kondo, Kariya (JP)

(73) Assignee: Kabushiki Kaisha Toyota Jidoshokki, Kariya-shi, Toyota (*) Notice: Subject to any disclaimer, the term of this patent is extended or adjusted under 35 U.S.C. 154(b) by 344 days.

(21) Appl. No.: 11/125,738

(22) Filed: May 10, 2005

(65) Prior Publication Data
US 2005/0255377 A1 Nov. 17, 2005

(30) Foreign Application Priority Data
May 13, 2004 (JP) ............... P2004-143520

(51) Int. Cl.
*B60R 16/04* (2006.01)

(52) U.S. Cl. .................................... 180/68.5

(58) Field of Classification Search ............. 180/68.5; 296/65.05; 248/500, 503, 505
See application file for complete search history.

(56) References Cited

U.S. PATENT DOCUMENTS

| | | | | | |
|---|---|---|---|---|---|
| 1,734,645 | A | * | 11/1929 | Polland | 180/68.5 |
| 2,833,363 | A | * | 5/1958 | Henehan | 180/68.5 |
| 3,165,163 | A | * | 1/1965 | Holka | 180/68.5 |
| 3,903,981 | A | * | 9/1975 | Peterson | 180/68.5 |
| 3,927,727 | A | * | 12/1975 | Hanagan | 180/219 |
| 4,213,510 | A | * | 7/1980 | Wible | 180/68.5 |
| 4,355,695 | A | * | 10/1982 | Leskovec | 180/68.5 |
| 4,359,121 | A | * | 11/1982 | Messner et al. | 180/69.21 |
| 4,723,618 | A | * | 2/1988 | Coonradt | 180/68.5 |
| 5,360,307 | A | * | 11/1994 | Schemm et al. | 414/343 |
| 5,901,803 | A | * | 5/1999 | Harada | 180/69.2 |
| 6,161,810 | A | * | 12/2000 | Crow et al. | 248/503 |
| 6,186,256 | B1 | * | 2/2001 | Dignitti | 180/68.5 |
| 6,423,443 | B1 | * | 7/2002 | Tsuboi et al. | 429/98 |
| 6,568,496 | B1 | * | 5/2003 | Huang | 180/220 |
| 6,637,807 | B2 | * | 10/2003 | Gotz | 296/203.01 |
| 6,809,654 | B2 | * | 10/2004 | Hudson | 340/907 |
| 7,007,767 | B2 | * | 3/2006 | Damon | 180/68.5 |
| 7,201,384 | B2 | * | 4/2007 | Chaney | 180/68.5 |

FOREIGN PATENT DOCUMENTS

| | | |
|---|---|---|
| JP | 6-83506 | 11/1994 |
| JP | 2000-219093 | 8/2000 |

* cited by examiner

*Primary Examiner*—Christopher Ellis
*Assistant Examiner*—Vaughn T Coolman
(74) *Attorney, Agent, or Firm*—Morgan & Finnegan, LLP

(57) ABSTRACT

A battery stopper stops a battery from slipping from a battery compartment in a frame of a vehicle. The battery compartment has a side opening which enables the battery to be taken in and out of the battery compartment. The battery stopper includes a stopper member capable of closing the side opening so as to cross the side opening. The stopper member is pivotally supported by a pair of frame-side fixed members that are located on both sides of the side opening, thereby enabling the side opening to be opened and closed.

6 Claims, 13 Drawing Sheets

BATTERY STOPPER FOR FORKLIFT TRUCK

BACKGROUND

The present invention relates to a battery stopper with which a vehicle, in which a battery is mounted, is equipped, and more particularly to the battery stopper with which a battery forklift truck, in which a battery is mounted as a drive source, is equipped.

This type of battery stopper is described with reference to FIGS. 10 through 13. FIG. 10 is a schematic side view showing a forklift truck whose stopper member is in a closing state. FIG. 11 is a partial plan view showing the stopper member in the closing state. FIG. 12 is a schematic side view showing the forklift truck whose stopper member is in an open state. FIG. 13 is a partial plan view showing the stopper member in the open state.

As shown in FIG. 10, a frame 102 of a battery forklift truck 101 is provided with a battery compartment 112 in which a battery 110 is stored. The battery compartment 112 is provided by a front wall 113, a rear wall 114, one side wall (such as a left side wall) 115 (refer to FIG. 11) and a bottom wall 116 (refer to FIG. 10) that are formed on the frame 102. The battery compartment 112 has a right side opening 118 and a top opening 119. The side opening 118 of the battery compartment 112 enables the battery 110 to be taken in and out of the battery compartment 112 in a lateral direction of the forklift truck 101 (in a direction of an arrow in FIG. 13).

Still referring to FIG. 10, the top opening 119 of the battery compartment 112 is covered with a battery hood 122. The battery hood 122 is provided at the rear side thereof on the frame 102 through a hinge mechanism (not shown) for enabling the pivotal movement of the battery hood 122. By the pivotal movement of the battery hood 122, the position of the battery hood 122 is variable between a closing state (refer to FIG. 10), in which the battery hood 122 covers the top opening 119 of the battery compartment 112, and an open state (refer to FIG. 12), in which the battery hood 122 leaves the top opening 119 of the battery compartment 112 open. The battery hood 122 has formed thereon a driver's seat 123 (refer to FIG. 10) in which a driver is seated while driving the forklift truck 101.

As shown in FIGS. 10 and 11, the frame 102 is provided with a battery stopper 130. The battery stopper 130 closes the side opening 118 of the battery compartment 112 while enabling the side opening 118 of the battery compartment 112 to be opened (refer to FIGS. 12 and 13), thereby stopping the battery 110 from slipping from the battery compartment 112. The battery stopper 130 has a stopper member 132. One end of the stopper member 132 is pivotally supported through a supporting pin 140 by a single fitting portion 124 on the side of the frame 102 that is located on one side of the side opening 118, such as the front side of the side opening 118, thereby enabling the side opening 118 to be opened and closed.

Still referring to FIGS. 10 and 11, when the stopper member 132 is in the closing position, the side opening 118 is closed, thereby stopping the battery 110 from slipping from the battery compartment 112 through the side opening 118, for example, when the forklift truck 101 is revolved.

As shown in FIGS. 12 and 13, in the state where the battery hood 122 is open and when the stopper member 132 is in the open position, the side opening 118 is open, thereby enabling the battery 110 to be taken in and out of the battery compartment 112. Taking the battery 110 in and out of the battery compartment 112 is performed, for example, by another forklift truck (not shown). Such a battery stopper 130 is disclosed, for example, in Japanese Unexamined Patent Publication No. 2000-219093.

According to the battery stopper 130 of the cited reference, however, the stopper member 132 is supported through the supporting pin 140 by the single fitting portion 124 on the side of the frame 102. Therefore, the stopper member 132 is not effectively used except that the stopper member 132 stops the battery 110 from slipping from the battery compartment 112.

SUMMARY

The present invention is directed to a battery stopper which improves strength of a frame while stopping a battery from slipping off.

The present invention has the following features. A battery stopper stops a battery from slipping from a forklift truck. The battery stopper has a frame for forming a part of the forklift truck, and a battery compartment provided in the frame. The battery compartment is located under a driver's cab of the forklift truck. A side opening is provided in the battery compartment by opening a side face of the frame. The side opening enables the battery to be taken in and out of the battery compartment in a lateral direction of the forklift truck. The battery stopper includes a stopper member for stopping the battery from moving in the lateral direction of the vehicle through the side opening. The stopper member is pivotally supported by a pair of fitting members that are located on both sides of the side opening in a traveling direction of the vehicle, and the stopper member also connects both of the fitting members.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments, together with the accompanying drawing, in which:

DETAILED DESCRIPTION OF THE PREFERRED EMBODIMENTS

A best mode for implementing the present invention will now be described with reference to the following embodiment.

Figure 1:
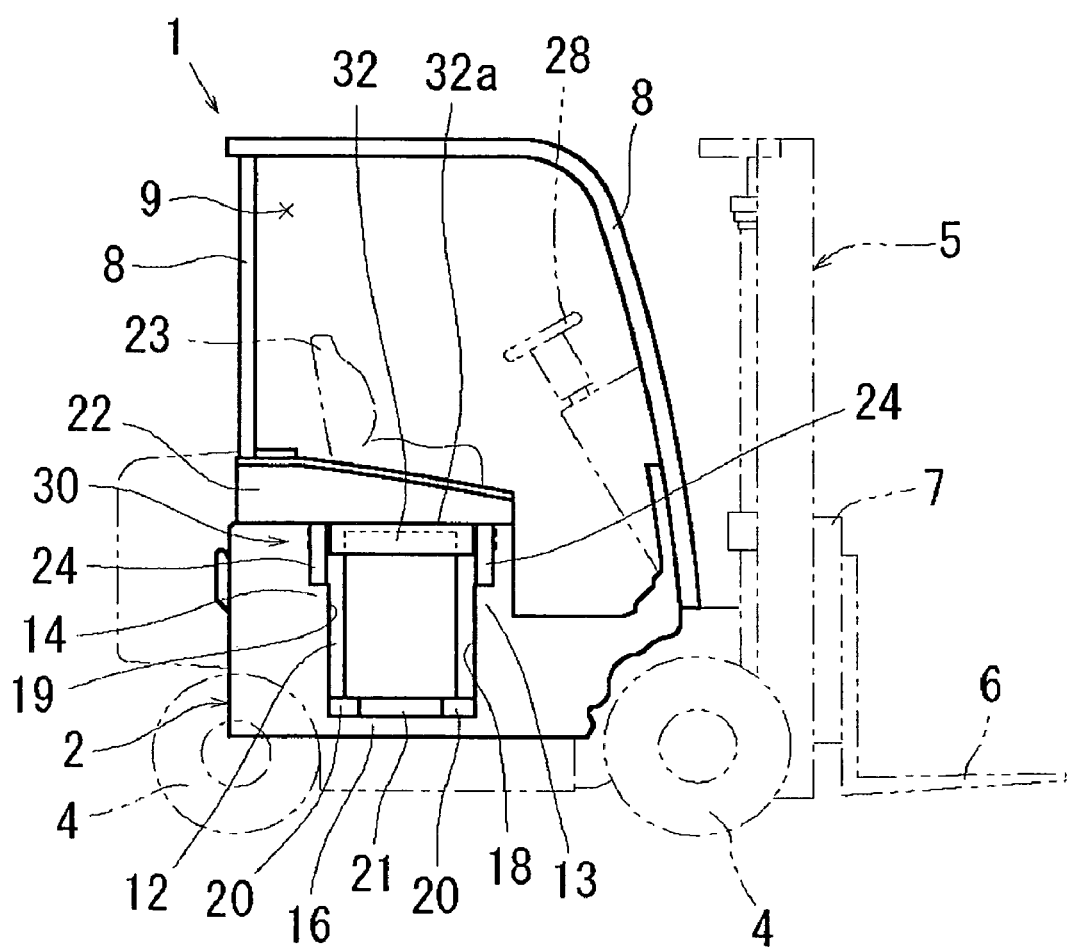
FIG. 1 is a schematic side view showing a forklift truck whose stopper member according to a preferred embodiment of the present invention is in a closing state.
Figure 2:
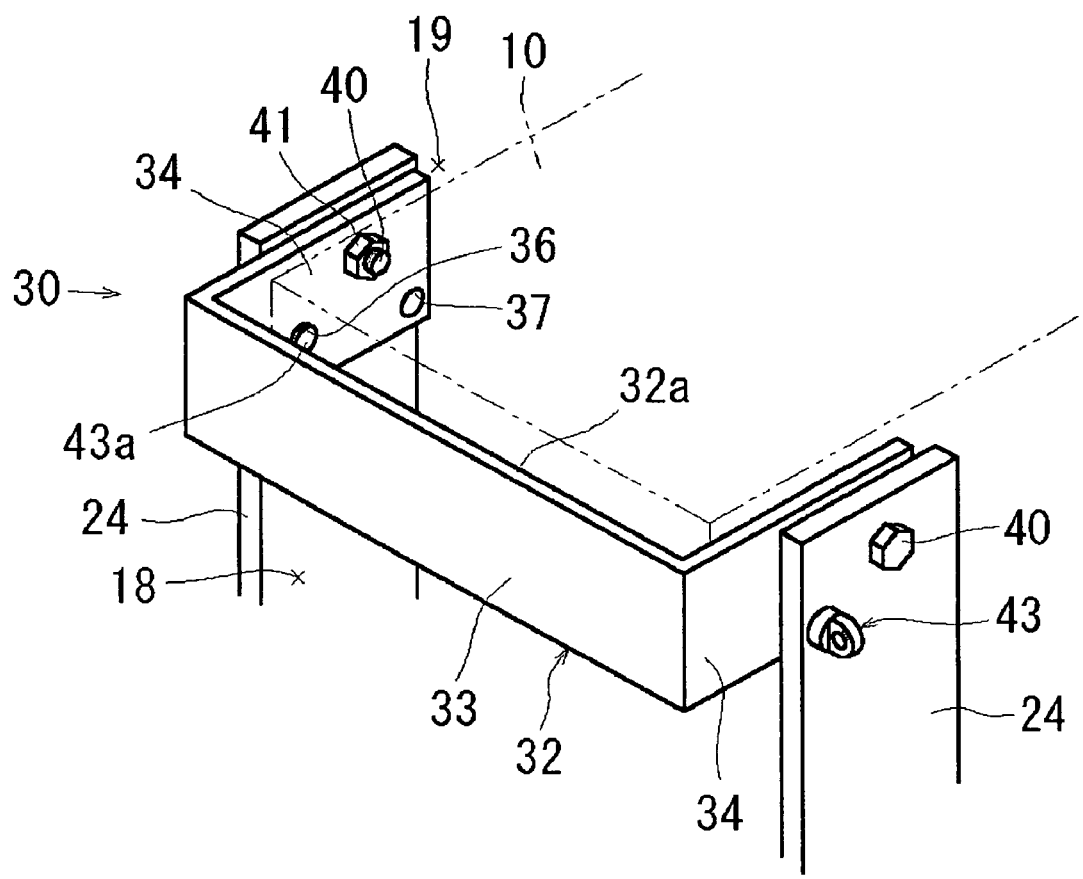
FIG. 2 is a perspective view showing a stopper member in the closing state.
Figure 3:
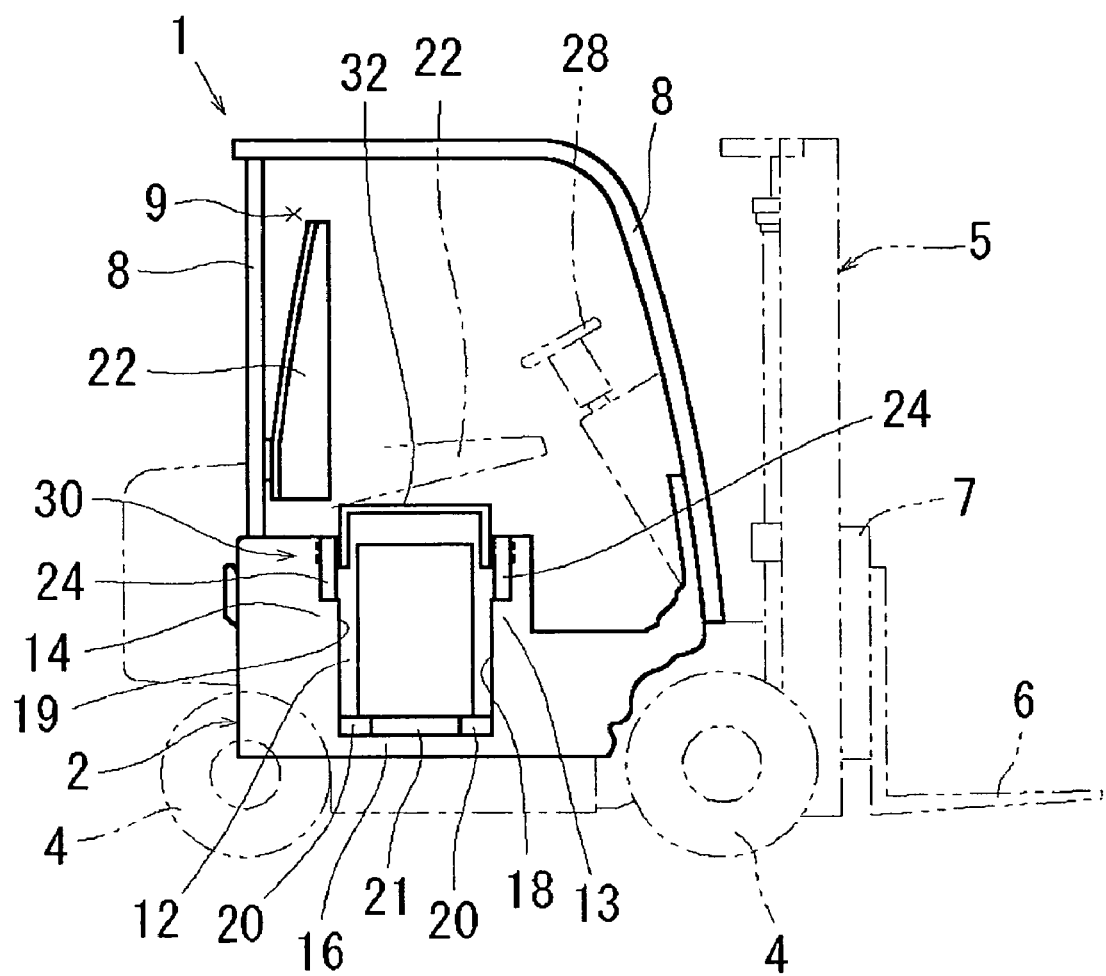
FIG. 3 is a schematic side view showing the forklift truck whose stopper member is in an open state.
Figure 4:
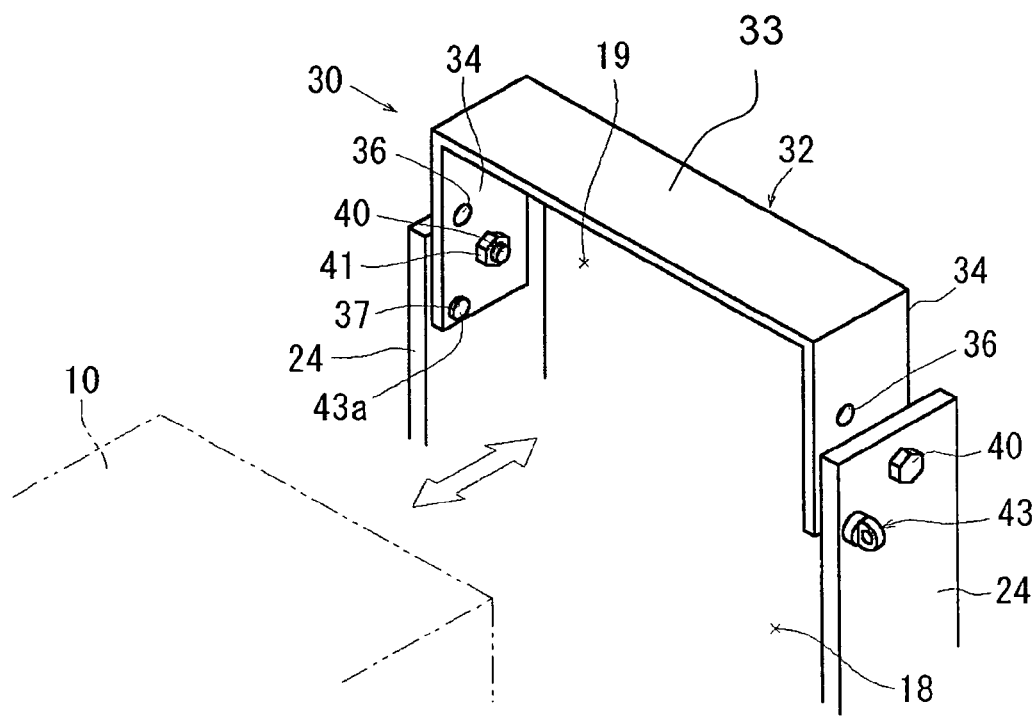
FIG. 4 is a perspective view showing the stopper member in the open state.
Figure 5:
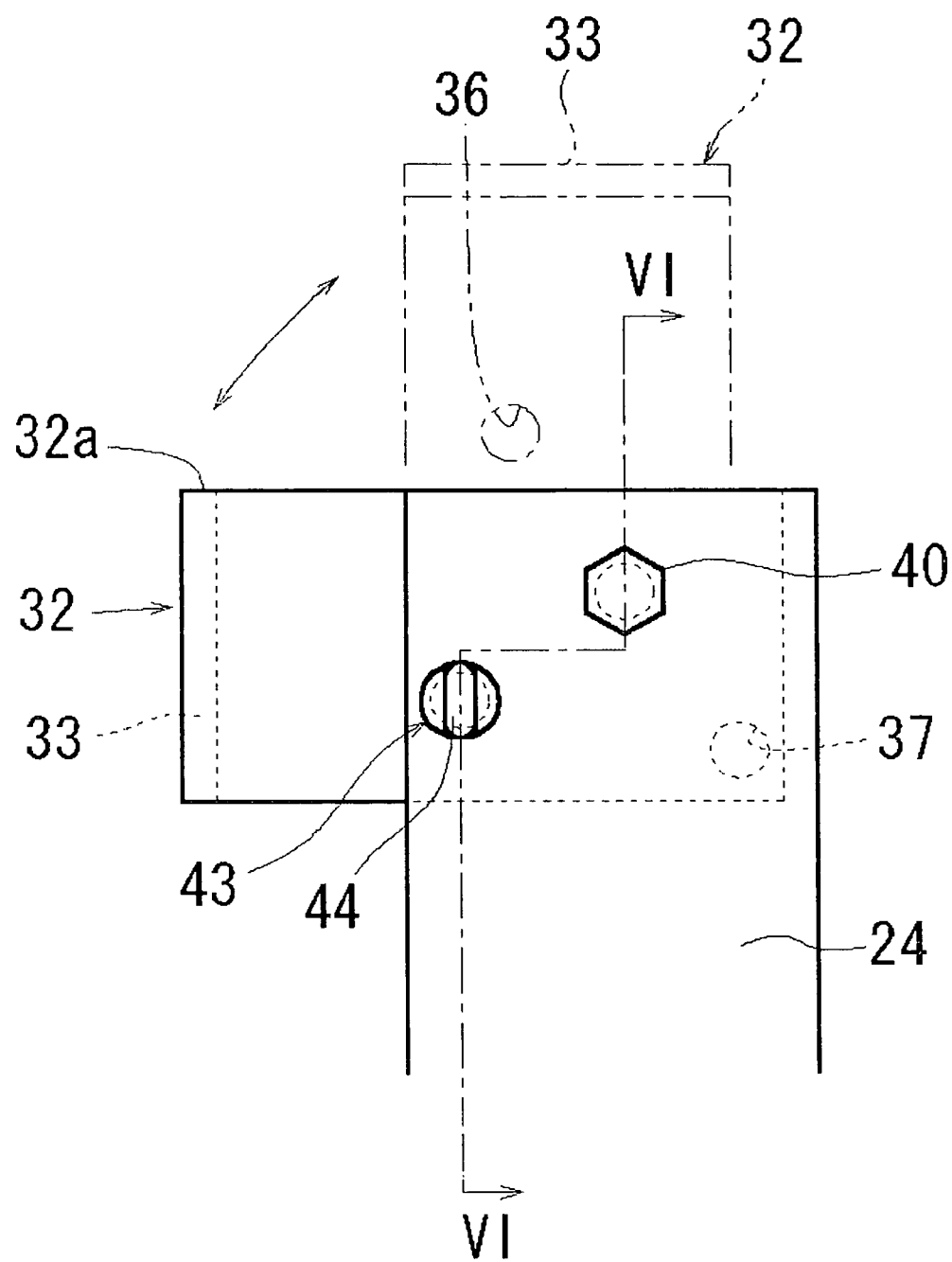
FIG. 5 is a side view showing a fitting portion of the stopper member.
Figure 6:
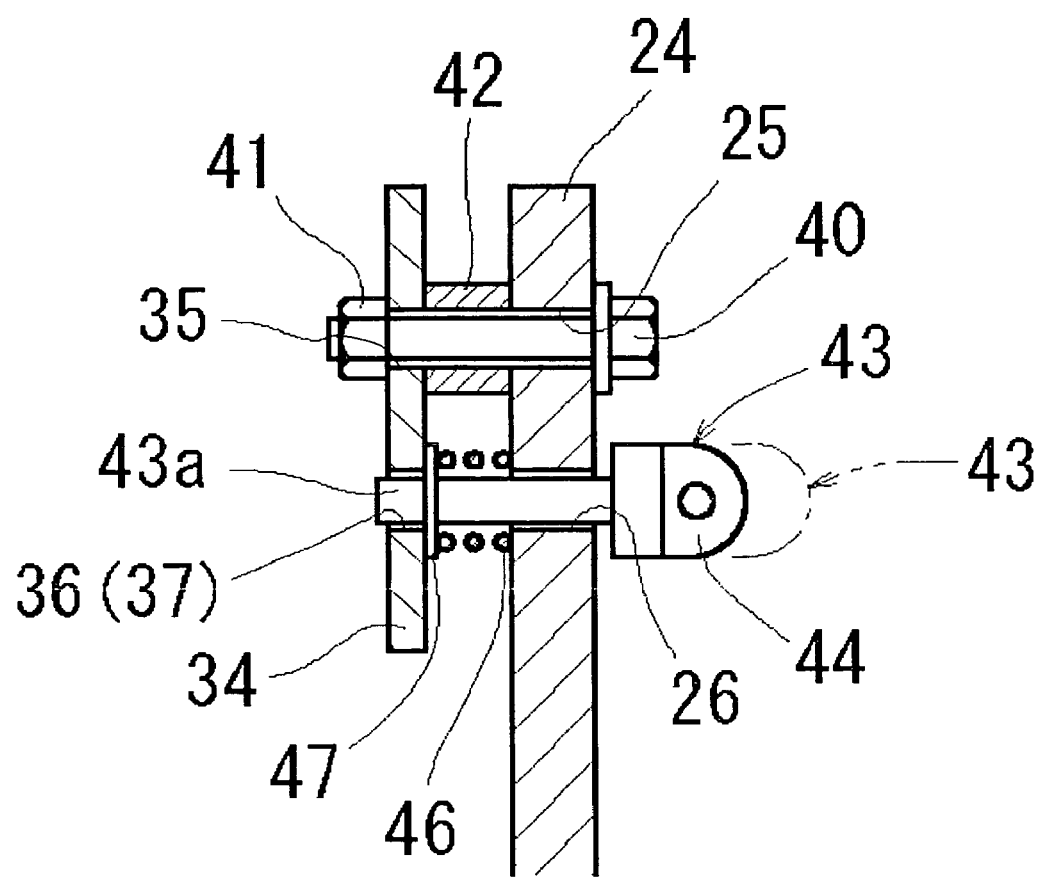
FIG. 6 is a sectional view taken on the line VI-VI of FIG. 5 as seen in the direction of the arrows.
Figure 7:
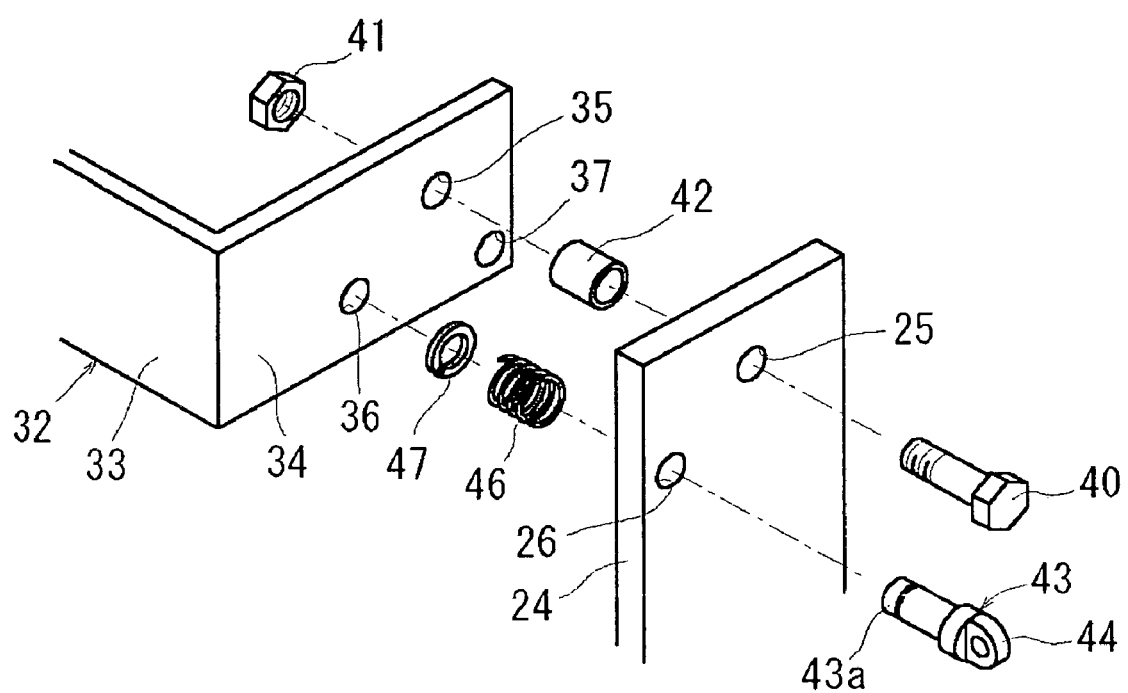
FIG. 7 is an exploded perspective view showing the fitting portion of the stopper member.

A preferred embodiment of the present invention will be described with reference to drawings. In the present embodiment, a battery stopper applied to a battery forklift truck is exemplified. The battery forklift truck has mounted a battery as a drive source therein. FIG. 1 is a schematic side view showing a forklift truck whose stopper member is in a closing state. FIG. 2 is a perspective view showing the stopper member in the closing state. FIG. 3 is a schematic side view showing the forklift truck whose stopper member is in an open state. FIG. 4 is a perspective view showing the stopper member in the open state. FIG. 5 is a side view showing a fitting portion of the stopper member. FIG. 6 is a sectional view taken on the line VI-VI of FIG. 5 as seen in the direction of the arrows. FIG. 7 is an exploded perspective view showing the fitting portion of the stopper member.

Referring to FIG. 1, a battery forklift truck 1 has a frame 2 which has built-in an electric motor (not shown) serving as a drive source and which is capable of running with four wheels 4. The frame 2 is formed with a mast unit 5 at the front side thereof. The mast unit 5 has a lift bracket 7 which is capable of rising and falling. The lift bracket 7 engages with a fork 6. The frame 2 is formed with a plurality of pillars 8 thereon, and these pillars 8 form a driver's cab 9.

The frame 2 is provided with a boxy battery compartment 12 on the downside of the driver's cab 9. In the boxy battery compartment 12, a battery 10 is stored. The battery compartment 12 is provided by a front wall 13, a rear wall 14, one side wall such as a left side wall (not shown) and a bottom wall 16. These components are formed on the frame 2 by a panel material or a frame material. The battery compartment 12 has a right side opening 18 and a top opening 19. The side opening 18 of the battery compartment 12 enables the battery 10 to be taken in and out of the battery compartment 12 in a lateral direction of the forklift truck 1 (in a perpendicular direction to the drawing in FIG. 1). The generic term "battery" in the present embodiment includes the one where the predetermined number of battery cells is stored in a battery case.

A pair of seats 20 is arranged on the bottom wall 16 of the battery compartment 12 for supporting the battery 10. By mounting the battery 10 on both seats 20, space 21 is formed between the bottom wall 16 of the battery compartment 12 and the battery 10. Another forklift truck (not shown) is capable of inserting its fork into the space 21.

The top opening 19 of the battery compartment 12 is covered with a battery hood 22. The battery hood 22 is pivotally connected at the lateral rear side thereof to the frame 2 through a hinge mechanism (not shown). By the pivotal movement of the battery hood 22, the position of the battery hood 22 is variable between a closing state (refer to FIG. 1), in which the battery hood 22 covers the top opening 19 of the battery compartment 12, and an open state (refer to FIG. 3), in which the battery hood 22 leaves the top opening 19 of the battery compartment 12 open.

As shown in FIG. 1, in the state where the battery hood 22 is closed, the battery hood 22 is supported by the circumferential wall of the battery compartment 12, that is, the supporting members of the front wall 13, the real wall 14, and the left side wall (not shown). In addition, the battery hood 22 is supported by a stopper member 32 to be described later.

The battery hood 22 has formed thereon a driver's seat 23 in which a driver is seated while driving the forklift truck 1. The battery hood 22 is equivalent to "a cover member" in the present invention.

Still referring to FIG. 1, the frame 2 is provided with a pair of fitting portions 24 that are located on both sides on the top end of the side opening 18. Each fitting portion 24 is formed in the shape of a protruding portion. Both of the fitting portions 24 are equipped with a battery stopper 30. The battery stopper 30 closes the side opening 18 of the battery compartment 12 while enabling the side opening 18 of the battery compartment 12 to be opened, thereby stopping the battery 10 from slipping from the battery compartment 12.

The battery stopper 30 has a stopper member 32 capable of closing the side opening 18 so as to cross the top end of the side opening 18.

As shown in FIG. 2, the stopper member 32 includes a metallic main plate 33 in the shape of a band plate that extends in a traveling direction of the forklift truck 1, and a pair of fitting members 34 that are bent from both ends of the main plate 33 orthogonally in the same direction.

Now, structure of mounting both fitting members 34 of the stopper member 32 respectively on both fitting portions 24 of the frame 2 will be described. Since the mounting structure of both fitting members 34 is symmetric on both front and rear fitting-members 34, mounting structure of the front fitting-member 34 only will be described and the description of mounting structure of the rear fitting-member 34 will be omitted.

As shown in FIG. 7, the front fitting member 34 of the stopper member 32 is formed with a fitting hole 35 and a pair of pinholes 36, 37. The fitting hole 35 is located on the upside of the fitting member 34 and the pinholes 36, 37 are located on the downside of the fitting member 34. In the present embodiment, each of the fitting hole 35, the pinholes 36, 37 is a through hole. The pinhole 36 is located on the proximal side of the fitting member 34 and the pinhole 37 is located on the distal side of the fitting member 34. The pinhole 36 is called "a closing-side pinhole" and the pinhole 37 is called "an open-side pinhole".

Meanwhile, the fitting portion 24 is formed with a fitting hole 25 and a pinhole 26. The fitting hole 25 corresponds to the fitting hole 35 of the stopper member 32. The pinhole 26 corresponds to the open-side pinhole 37 in a standing state of the stopper member 32 (refer to the stopper member 32 illustrated by chain double-dashed line in FIG. 5) while corresponding to the closing-side pinhole 36 in a lying state of the stopper member 32. In the present embodiment, each of the fitting hole 25 and the pinhole 26 is a through hole. The fitting portion 24 is equivalent to "a fitting member" in the present invention.

The fitting portion 24 is provided with the fitting member 34 of the stopper member 32 as follows. As shown in FIG. 6, the fitting member 34 is located inside the fitting portion 24. In addition, in the state where the fitting hole 25 of the fitting portion 24 and the fitting hole 35 of the fitting member 34 are aligned with each other, a supporting bolt 40 is inserted into the fitting holes 25, 35, and a nut 41 is screwed on the supporting bolt 40. Thus, as shown in FIG. 2, in the state where both fitting members 34 of the stopper member 32 are supported by both fitting portions 24, both fitting members 34 of the stopper member 32 are mounted on both fitting portions 24 so as to be capable of pivoting on an axis of the supporting bolt 40, thereby enabling the side opening 18 to be opened and closed between a closing position (refer to FIGS. 1 and 2), in which the stopper member 32 closes the side opening 18, and an open position (refer to FIGS. 3 and 4), in which the stopper member 32 opens the side opening 18. It is noted that a cylindrical spacer 42 is interposed between the fitting portion 24 and a retaining ring 47 in the state where the cylindrical spacer 42 is fitted on the supporting bolt 40.

Still referring to FIG. 6, a headed locating-pin 43 is provided in the pinhole 26 of the fitting portion 24 so as to be movable in an axial direction thereof. The head of the locating pin 43 is provided with a lug 44 in order for an operator to operate the lug 44 with his fingers. The locating pin 43 is inserted through the pinhole 26 of the fitting portion 24 from the outside of the battery compartment 12 to the inside thereof. A resilient member 46 formed by a coil spring is fitted on the locating pin 43 which protrudes from the fitting portion 24 to the inside of the battery compartment 12, and the retaining ring 47 is mounted on the locating pin 43 thereby preventing the resilient member 46 from dropping out of the locating pin 43. It is noted that the retaining ring 47 is fitted in an annular groove (not shown) formed in the locating pin 43.

The resilient member 46 continuously urges the locating pin 43 in a direction in which the locating pin 43 protrudes inside the battery compartment 12 between the fitting portion 24 and the retaining ring 47 is capable of selectively engaging with one of the pinholes 36, 37 of the stopper member 32. It is noted that each of the pinholes 36, 37 of the stopper member 32 is equivalent to "an engaging portion" in the present invention.

As shown in FIG. 2, in the state where the distal end 43a of the locating pin 43 engages with the closing-side pinhole 36 of the stopper member 32, the stopper member 32 is located in the closing position. That is, the pivotal movement of the stopper member 32 is stopped (refer to the stopper member 32 shown by solid line in FIG. 5). A top face 32a of the stopper member 32, which is located in the closing position, forms substantially an identical plane with the circumferential wall of the battery compartment 12, that is, the supporting members of the front wall 13, the rear wall 14 and the left side wall (not shown), which support the battery hood 22. By the plane, is supported a corresponding portion of the battery hood 22 in the closing state (refer to FIG. 1).

Meanwhile, as shown in FIG. 4, in the state where the distal end 43a of the locating pin 43 engages with the open-side pinhole 37 of the stopper member 32, the stopper member 32 is located in the open position (refer to the stopper member 32 shown by chain double-dashed line in FIG. 5). The main plate 33 of the stopper member 32, which is located in the open position, is located above the battery 10 in the battery compartment 12, thereby stopping the battery 10 from being excessively raised. In addition, the main plate 33 of the stopper member 32, which is located in the open position, interferes with the battery hood 22 which is closed from the open state (refer to FIG. 3), thereby stopping a closing motion of the battery hood 22.

In the state where the stopper member 32 of the above-structured battery stopper 30 is in the closing position as shown in FIGS. 1 and 2, the distal end 43a of the locating pin 43 engages with the closing-side pinhole 36 of the stopper member 32 by urging force of the resilient member 46, thereby locating the stopper member 32 in the closing position.

In this state, the forklift truck 1 is normally operated, and at the same time the stopper member 32 closes the side opening 18 of the battery compartment 12 in the frame 2 so as to cross the side opening 18, thereby stopping the battery 10 from slipping from the battery compartment 12 through the side opening 18, for example, when the forklift truck 1 is revolved. Meanwhile, the stopper member 32 which is supported by both fitting portions 24 of the frame 2 that are located on both sides of the side opening 18 serves as a connecting member. The connecting member connects both fitting portions 24 located in the side opening 18. In addition, the stopper member 32 in the closing position stably supports the battery hood 22 in the closing state in the side opening 18 (refer to FIG. 1).

Upon replacement of the battery 10, the battery hood 22 is first opened to be in the open state (refer to FIG. 3). Then, the engagement of the distal ends 43a of the locating pins 43 with both closing-side pinholes 36 of the stopper member 32 is released by pulling the lugs 44 of both locating pins 43 with the operator's fingers and retreating each locating pin 43 (refer to the locating pin 43 shown by chain double-dashed line in FIG. 6) against the urging force of the corresponding resilient member 46. In this state, the stopper member 32 is pivoted by an angle of 90 degrees so as to stand up. In the state where the open-side pinhole 37 of the stopper member 32 is aligned with the locating pin 43, the force which pulls the locating pin 43 against the urging force of the resilient member 46 is released. Then, the locating pin 43 is introduced into the open-side pinhole 37 of the stopper member 32 by the urging force of the resilient member 46, so that the distal end 43a of the locating pin 43 is engaged with the open-side pinhole 37 of the stopper member 32, thereby locating the stopper member 32 in the open position (refer to FIG. 4).

It is noted that the force which pulls the locating pin 43 against the urging force of the resilient member 46 may be released in the middle of pivotal movement of the stopper member 32. In this case, the distal end 43a of the locating pin 43 relatively slides along the fitting member 34 by the pivotal movement of the stopper member 32 in the state where the distal end 43a is in contact with the fitting member 34. When the open-side pinhole 37 of the stopper member 32 is aligned with the locating pin 43, the locating pin 43 is introduced into the open-side pinhole 37 of the stopper member 32 by the urging force of the resilient member 46, so that the distal end 43a of the locating pin 43 is engaged with the open-side pinhole 37 of the stopper member 32.

In this state, forks of another forklift truck (not shown) are inserted into the space 21 (refer to FIG. 3) between the bottom wall 16 of the battery compartment 12 and the battery 10, and raises the battery 10 so as to scoop up the battery 10 out of the space 21, thereby distancing the battery 10 from the seats 20. If the battery 10 is excessively raised, since the battery 10 interferes with the stopper member 32 (or the main plate 33), the driver for the forklift truck is capable of immediately noticing the excessive rise of the battery 10. In this case, the battery 10 is lowered in such an extent that the battery 10 is distanced from the stopper member 32.

After the battery 10 is removed from the battery compartment 12 by retreating the forklift truck which has scooped up the battery 10, the battery 10 is transported to a predetermined place and is fixed by the forklift truck.

A charged battery 10 is transported into the battery compartment 12 by the forklift truck in reverse order to the above-mentioned description. Then, the engagement of the distal ends 43a of the locating pins 43 with both open-side pinholes 37 of the stopper member 32 is released by pulling the lugs 44 of both locating pins 43 with the operator's fingers and retreating each locating pin 43 (refer to the locating pin 43 shown by chain double-dashed line in FIG. 6) against the urging force of the corresponding resilient member 46. In this state, the stopper member 32 is pivoted by an angle of 90 degrees so as to be laid. In the state where the closing-side pinhole 36 of the stopper member 32 is aligned with the locating pin 43, the force which pulls the locating pin 43 against the urging force of the resilient member 46 is released. Then, the locating pin 43 is introduced into the closing-side pinhole 36 of the stopper member 32 by the urging force of the resilient member 46, so that the distal end 43a of the locating pin 43 is engaged with the closing-side pinhole 36 of the stopper member 32, thereby locating the stopper member 32 in the closing position (refer to FIG. 2).

If the force which pulls the locating pin 43 against the urging force of the resilient member 46 is released in the middle of pivotal movement of the stopper member 32, in a similar manner to the above-mentioned description, the distal end 43a of the locating pin 43 relatively slides along the fitting member 34 by the pivotal movement of the stopper member 32 in the state where the distal end 43a is in contact with the fitting member 34. When the closing-side pinhole 36 of the stopper member 32 is aligned with the locating pin 43, the locating pin 43 is introduced into the closing-side pinhole 36 of the stopper member 32 by the urging force of the resilient member 46, so that the distal end 43a of the locating pin 43 is engaged with the closing-side pinhole 36 of the stopper member 32. Thereafter, the battery hood 22 is closed to be in the closing state.

In the state where the stopper member 32 is in the open position, since the battery hood 22 interferes with the stopper member 32, a closing motion of the battery hood 22 is stopped (refer to the battery hood 22 shown by chain double-dashed line in FIG. 3). In this case, as mentioned above, the stopper member 32 is moved to the closing position and then the battery hood 22 is closed.

Thus, the replacement of the battery 10 is completed.

According to the above-mentioned battery stopper 30, the stopper member 32, which is capable of closing the side opening 18 of the forklift truck 1 so as to cross the side opening 18, is pivotally supported by both fitting portions 24 on the side of the frame 2 that are located on both sides of the side opening 18 thereby enabling the side opening 18 to be opened and closed (refer to FIGS. 1 through 4).

Therefore, when the stopper member 32 is in the closing position, the side opening 18 is closed, thereby stopping the battery 10 from slipping from the battery compartment 12 through the side opening 18, for example, when the forklift truck 1 is revolved (refer to FIGS. 1 and 2).

When the stopper member 32 is in the open position, the side opening 18 is open, thereby enabling the battery 10 to be taken in and out of the battery compartment 12 (refer to FIGS. 3 and 4).

The stopper member 32, which is supported by both fitting portions 24 on the side of the frame 2 that are located on both sides of the side opening 18, serves as a connecting member which connects both fitting portions 24 located in the side opening 18, thereby improving strength of the frame 2 while stopping the battery 10 from slipping from the battery compartment 12.

Also, since the stopper member 32 is supported by both fitting portions 24 on the side of the frame 2 that are located on both sides of the side opening 18, in comparison with the case that the stopper member 32 is supported by a single fitting portion 24, the thickness of the stopper member 32 is reduced thereby enabling the fitting member 34 to be easily bent.

The excessive rise of the battery 10 is stopped by the stopper member 32 in the open position (refer to FIGS. 3 and 4). For example, when the battery 10 is scooped up and lifted up by another forklift truck, the stopper member 32 is used as a mark of height of the battery 10, thereby preventing the battery 10 which excessively rises from interfering with a member on the side of the forklift truck 1 such as the battery hood 22 or a steering wheel 28 (refer to FIG. 3).

When the stopper member 32 is in the open position (refer to FIGS. 3 and 4), a closing motion of the battery hood 22 is stopped, thereby preventing the driver from forgetting to close the stopper member 32 (refer to the battery hood 22 shown by chain double-dashed line in FIG. 3).

The stopper member 32 in the closing position enables the battery hood 22 in the closing state to be stably supported in the side opening 18 (refer to FIG. 1). More specifically, for example, since no member, which supports the battery hood 22, existed in the side opening 18 heretofore, the battery hood 22 had to be formed with a reinforcing member. Therefore, a complicatedly structured battery hood was necessarily adopted. However, according to the present embodiment, as described above, the stopper member 32 in the closing position enables the battery hood 22 in the closing state to be stably supported in the side opening 18, thereby simplifying the structure of the battery hood 22.

In the above embodiment, the stopper member 32 in the closing position enables the battery hood 22 in the closing state to be stably supported in the side opening 18. However, the following modified embodiments 1 and 2 may also be adopted.

Modified Embodiment 1

Figure 8:
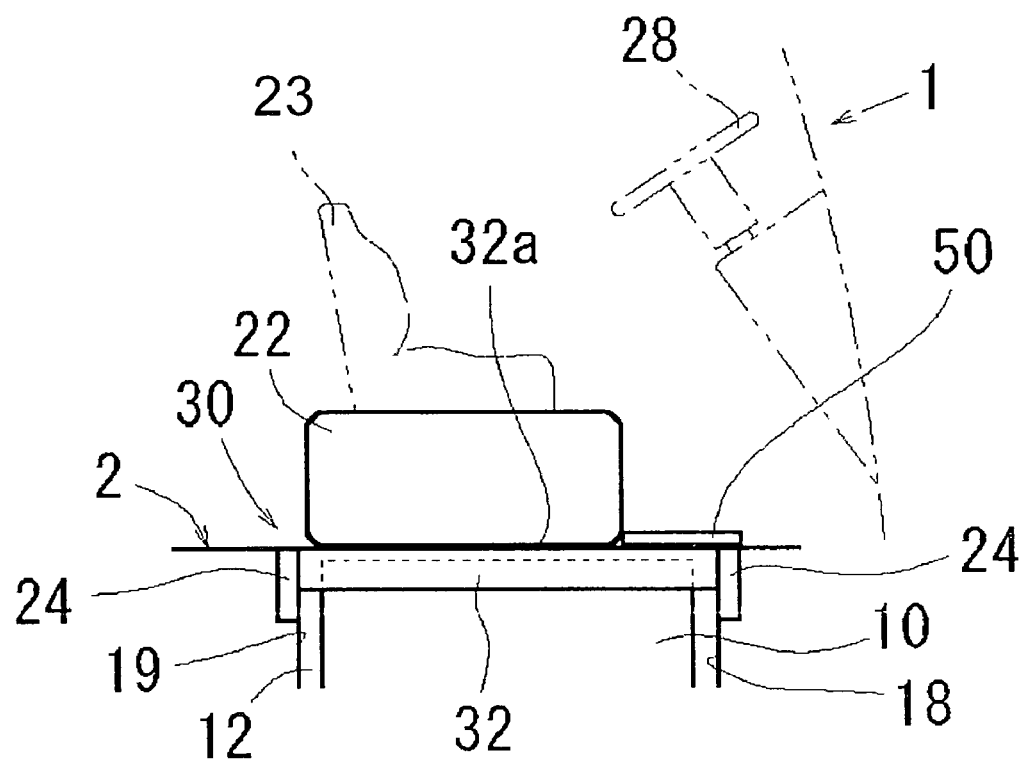
FIG. 8 is a schematic side view showing modified embodiment 1.

As shown in FIG. 8, in the case where the top opening 19 of the battery compartment 12 is opened and closed by cooperation between the battery hood 22 and a toe board 50, the battery hood 22 and the toe board 50 that are in the closing state are stably supported in the side opening 18 by the stopper member 32 in the closing position. It is noted that the toe board 50 is provided on the frame 2 so as to be opened and closed by pivotal movement or desorption. In this case, the battery hood 22 and the toe board 50 are equivalent to "a cover member" in the present invention.

Modified Embodiment 2

Figure 9:
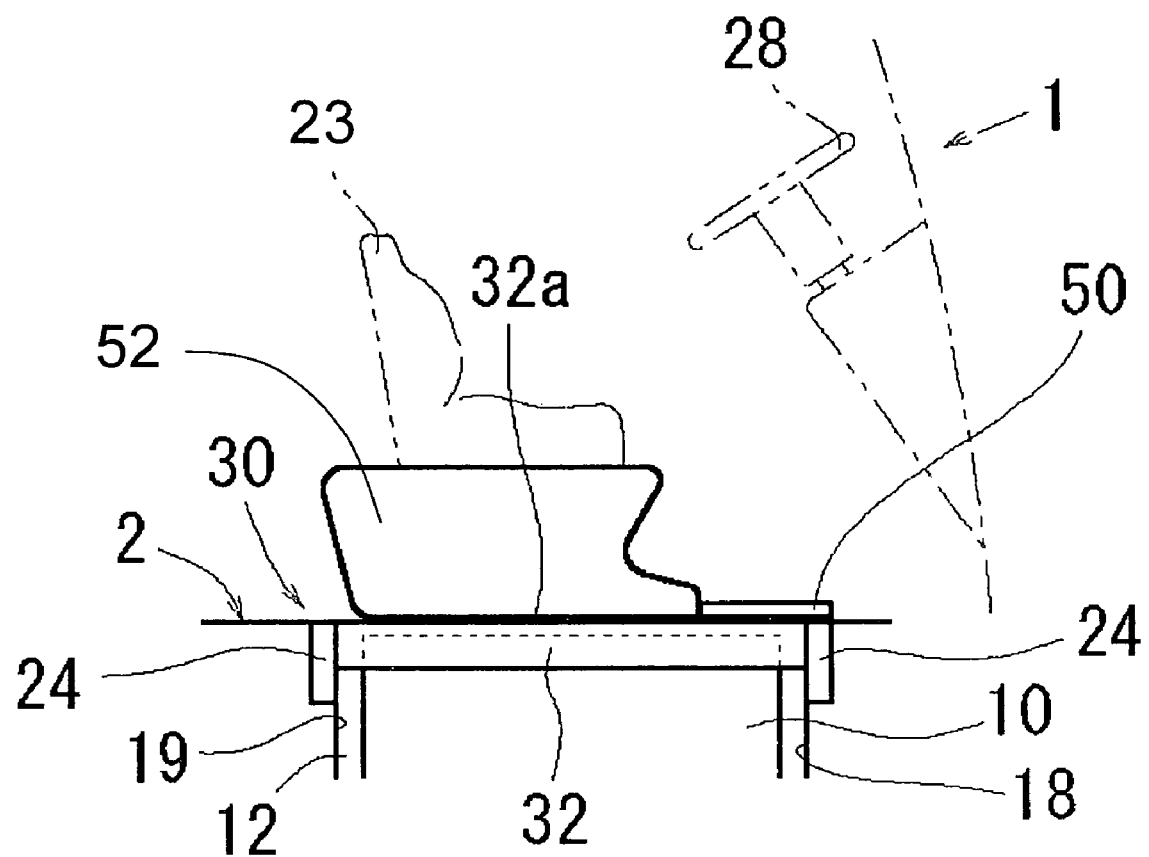
FIG. 9 is a schematic side view showing modified embodiment 2.
Figure 10:
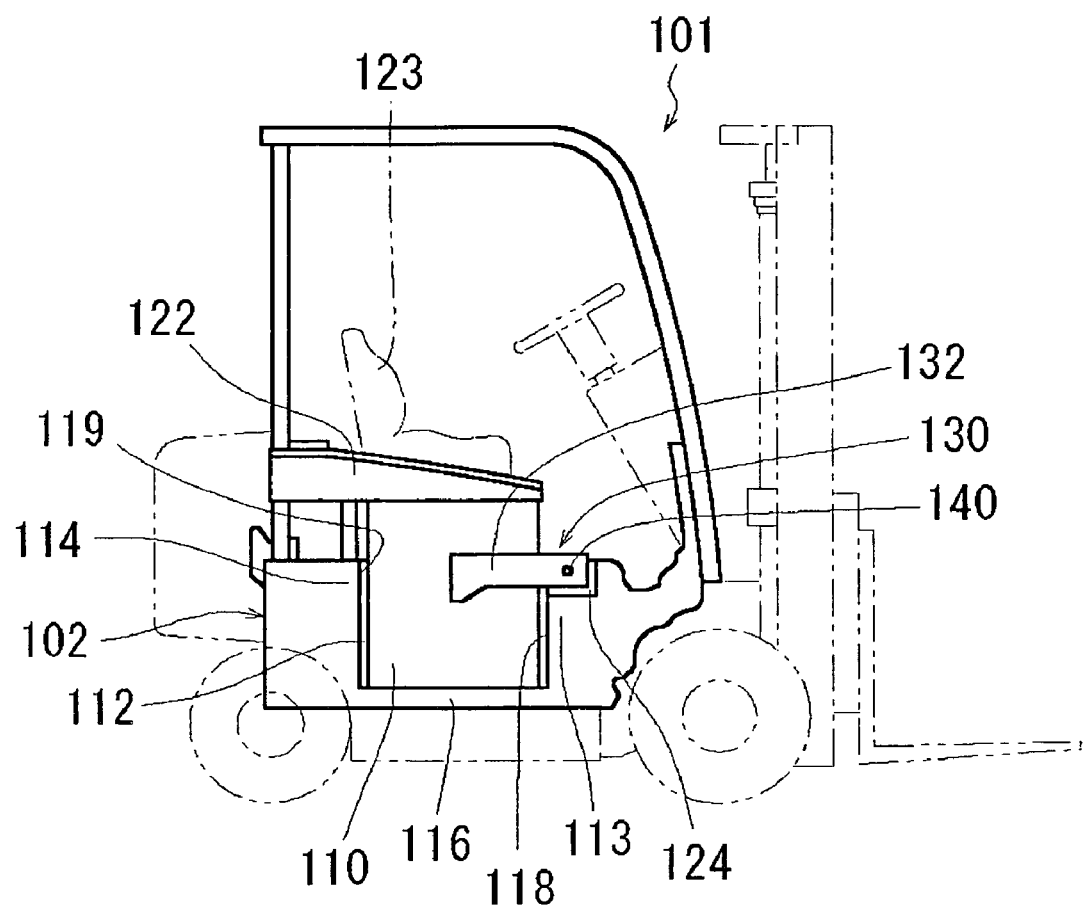
FIG. 10 is a schematic side view showing forklift truck whose stopper member according to a prior art is in a closing state.
Figure 11:
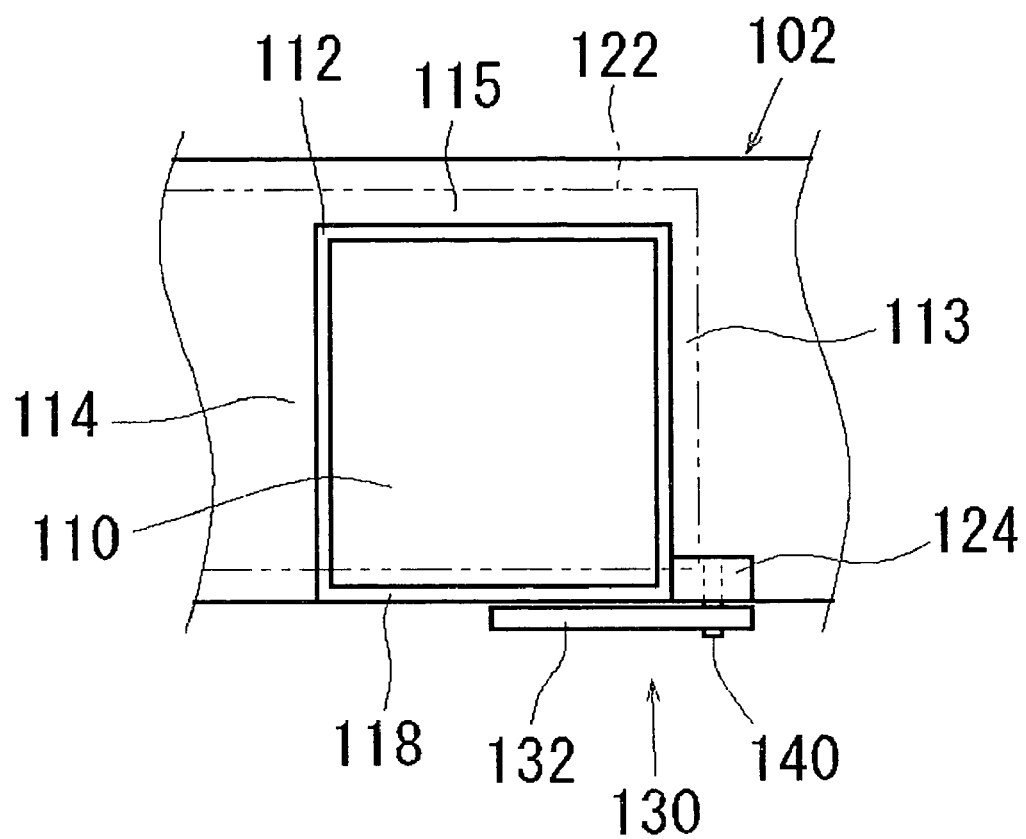
FIG. 11 is a partial plan view showing the stopper member in the closing state.
Figure 12:
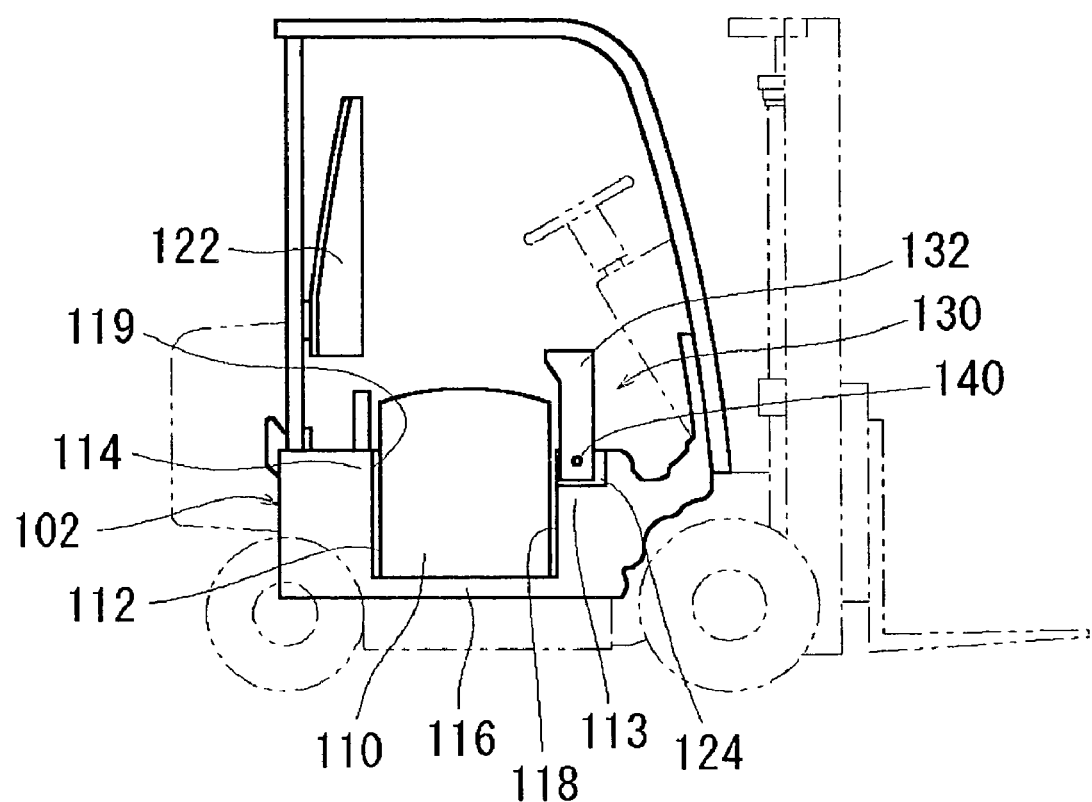
FIG. 12 is a schematic side view showing the forklift truck whose stopper member is in an open state.
Figure 13:
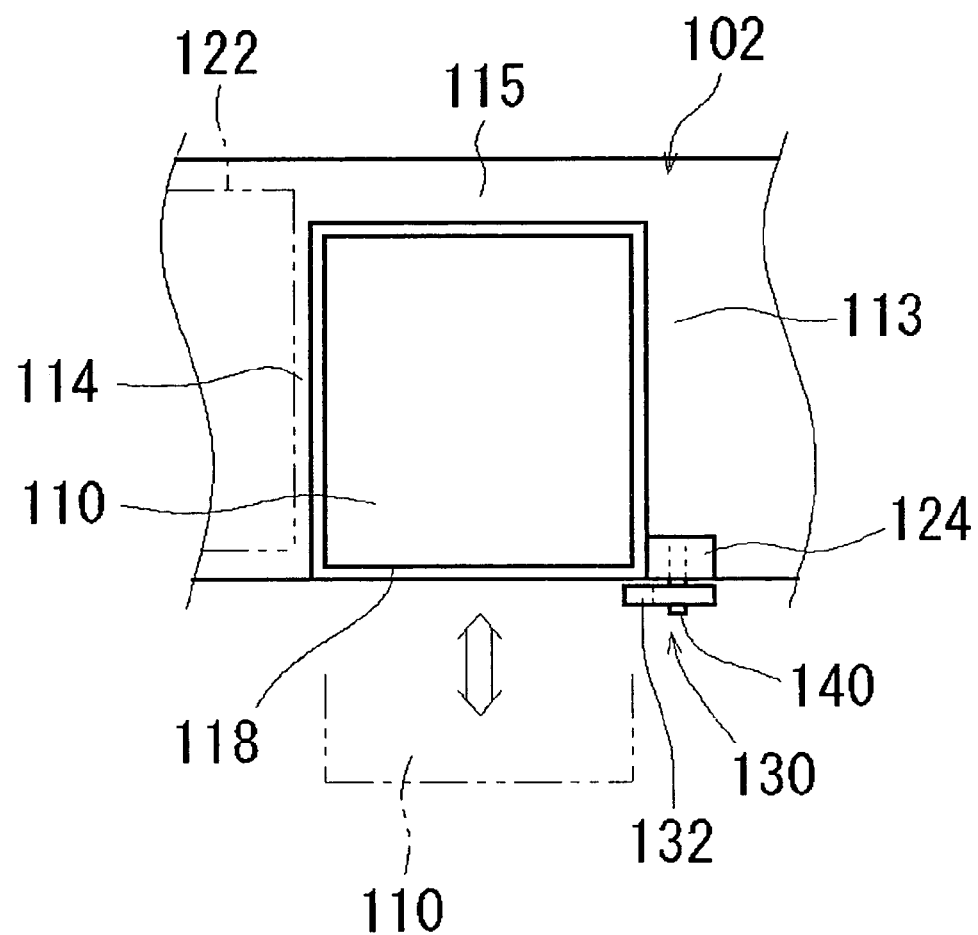
FIG. 13 is a partial plan view showing the stopper member in the open state.

As shown in FIG. 9, in the case where the top opening 19 of the battery compartment 12 is opened and closed by cooperation between the toe board 50 and a seat stand 52, the toe board 50 and the seat stand 52 that are in the closing state are stably supported in the side opening 18 by the stopper member 32 in the closing position. It is noted that the driver's seat 23, in which the driver is seated while driving the forklift truck 1, is provided on the seat stand 52. It is also noted that the seat stand 52 and the toe board 50 are provided on the frame 2 so as to be opened and closed by pivotal movement or desorption. In this case, the toe board 50 and the seat stand 52 are equivalent to "a cover member" in the present invention.

The locating pin 43 which is provided in the fitting portion 24 on the side of the frame 2 is engaged selectively with one of the pinholes 36, 37 of the stopper member 32 by the urging force of the resilient member 46, thereby locating the stopper member 32 in the closing position or in the open position (refer to FIG. 6).

The state, in which the engagement of the locating pin 43 with the pinhole 36 or 37 is released by retreating or moving the locating pin 43 against the urging force of the resilient member 46, enables the stopper member 32 to be pivoted toward the other position (the open position or the closing position).

Therefore, since the locating pin 43 is continuously held by the urging force of the resilient member 46 while engaging with the pinhole 36 or 37, the stopper member 32 is properly located in the closing position or in the open position. The locating pin 43 needs to be operated by the operator's hand, thereby preventing the locating the stopper member 32 from being unpreparedly released.

The present invention is not limited to the aforementioned embodiment, but may be modified within the scope of the appended claims, as exemplified below. The aforementioned embodiment is not limited to the battery stopper 30 of the forklift truck 1, but may be applied to a battery stopper for an industrial vehicle other than the forklift truck 1 such as an automatic guided vehicle or a tractor, which has mounted a battery therein, a construction vehicle or an automobile.

In alternative embodiments to the embodiments, the side opening 18 of the battery compartment 12 is not limited to be provided on the right side, but may be provided on the left side or on both of the right and left sides. In addition, the side opening 18 of the battery compartment 12 may be provided on any sides of the rear side, the front side, the right side and the left side by the forms of the vehicles.

In the aforementioned embodiments, the battery 10 is taken in and out of the battery compartment 12 by another forklift truck. However, in alternative embodiments to the embodiments, a rotor, such as a wheel or a roller, which supports the battery 10 while allowing the battery 10 to be moved in the lateral direction of the forklift truck 1, is provided beneath the battery 10 or in the bottom wall 16 of the battery compartment 12, thereby enabling the operator to take the battery 10 in and out of the battery compartment 12 without using a forklift truck.

In alternative embodiments to the embodiments, each of the pinholes 36, 37 of the stopper member 32 is not limited to the through hole, but may be replaced by a recess with a bottom.

In the aforementioned embodiments, the locating pin 43 is provided in the fitting portion 24 on the side of the frame 2, and each of the pinholes 36, 37 is provided in the stopper member 32. However, in alternative embodiments to the embodiments, each of the pinholes 36, 37 is provided in the fitting portion 24 on the side of the frame 2, and the locating pin 43 is provided in the stopper member 32.

Therefore, the present examples and embodiments are to be considered as illustrative and not restrictive and the invention is not to be limited to the details given herein but may be modified.

What is claimed is:

1. A battery stopper for stopping a battery, the battery being a drive source of a forklift truck, from slipping off the forklift truck, comprising:
   a frame for forming a part of the forklift truck;
   a battery compartment provided in the frame, the battery compartment being located under a driver's cab of the forklift truck;
   a side opening provided in the battery compartment by opening a side face of the frame, wherein the side opening enables the battery to be taken in and out of the battery compartment in a lateral direction of the forklift truck;
   a stopper member for stopping the battery from moving in the lateral direction of the vehicle through the side opening, wherein the stopper member is pivotally supported by a pair of fitting members that are located on both sides of the side opening in a traveling direction of the vehicle, and the stopper member also connects both of the fitting members, wherein when the stopper member is in a closing position where the stopper member crosses the side opening, the stopper member stops the battery from moving in the lateral direction of the forklift truck, and wherein when the stopper member is in an open position where the side opening is no longer crossed by the stopper member in the lateral direction of the forklift truck, the side opening enables the battery to move in the lateral direction of the forklift truck;
   a locating pin provided in one member of each frame-side fixed member and the stopper member so as to be movable in an axial direction thereof;
   a pair of engaging portions provided in the other member for enabling the locating pin to engage with the stopper member selectively in one position of the open position and the closing position; and
   a resilient member for urging the locating pin in a direction in which the locating pin is engaged with each engaging portion.

2. A battery stopper for stopping a battery, the battery being a drive source of a forklift truck, from slipping off the forklift truck, comprising:
   a frame for forming a part of the forklift truck;
   a battery compartment provided in the frame, the battery compartment being located under a driver's cab of the forklift truck;
   a side opening provided in the battery compartment by opening a side face of the frame, wherein the side opening enables the battery to be taken in and out of the battery compartment in a lateral direction of the forklift truck; and
   a stopper member for stopping the battery from moving in the lateral direction of the vehicle through the side opening, wherein the stopper member is pivotally supported by a pair of fitting members that are located on both sides of the side opening in a traveling direction of the vehicle, and the stopper member also connects both of the fitting members;
   wherein when the stopper member is in a closing position such that the stopper member crosses the side opening, the stopper member stops the battery from moving in the lateral direction of the forklift truck, and wherein when the stopper member is in an open position such that the side opening is no longer crossed by the stopper member in the lateral direction of the forklift truck, the side opening enables the battery to be moved in the lateral direction of the forklift truck; and
   wherein the forklift truck includes a cover member which is capable of opening and closing a top opening of the battery compartment, wherein the stopper member is formed so as to be capable of supporting the cover member in a closing state when the stopper member is in the closing position and wherein the stopper member in the closing position supports the cover member over the length of the side opening in the traveling direction of the forklift truck.

3. The battery stopper according to claim 2, wherein the cover member includes a battery hood.

4. A battery stopper for stopping a battery, the battery being a drive source of a forklift truck, from slipping off the forklift truck, comprising:
   a frame for forming a part of the forklift truck;
   a battery compartment provided in the frame, the battery compartment being located under a driver's cab of the forklift truck;
   a side opening provided in the battery compartment by opening a side face of the frame, wherein the side opening enables the battery to be taken in and out of the battery compartment in a lateral direction of the forklift truck; and a stopper member for stopping the battery from moving in the lateral direction of the vehicle through the side opening, wherein the stopper member is pivotally supported by a pair of fitting members that are located on both sides of the side opening in a traveling direction of the vehicle, and the stopper member also connects both of the fitting members;

wherein when the stopper member is in a closing position such that the stopper member crosses the side opening, the stopper member stops the battery from moving in the lateral direction of the forklift truck, and wherein when the stopper member is in an open position such that the side opening is no longer crossed by the stopper member in the lateral direction of the forklift truck, the side opening enables the battery to be moved in the lateral direction of the forklift truck; and wherein when the battery is stored in the battery compartment, a space is formed between a bottom wall of the battery compartment and the battery, wherein when the battery is scooped up, a fork of another forklift truck supports a bottom of the battery through the space, and wherein when the stopper member is in the open position, the stopper member is formed so as to be capable of stopping the battery from excessively rising.

5. The battery stopper according to claim 4, wherein the forklift truck includes a cover member which is capable of opening and closing a top opening of the battery compartment, and wherein when the stopper member is in the open position, the stopper member is formed so as to be capable of stopping a closing motion of the cover member.

6. The battery stopper according to claim 5, wherein the cover member includes a battery hood.

* * * * *

UNITED STATES PATENT AND TRADEMARK OFFICE
CERTIFICATE OF CORRECTION

PATENT NO. : 7,398,848 B2  Page 1 of 1
APPLICATION NO. : 11/125738
DATED : July 15, 2008
INVENTOR(S) : Hidehito Kondo It is certified that error appears in the above-identified patent and that said Letters Patent is hereby corrected as shown below:

Column 2, line 65, please delete "showing forklift truck" and insert therefore -- showing a forklift truck --;

Column 5, lines 43-44, please delete "By the plane, is supported a corresponding" and insert therefore -- A corresponding --;

Column 5, line 45, please delete "FIG.l)." and insert therefore -- FIG. 1) is supported by the plane. --;

Column 6, line 47, please delete "raises" and insert therefore -- raise --;

Column 6, line 53, please delete "lowered in such" and insert therefore -- lowered to such --;

Column 9, line 6, please delete "preventing the locating the stopper" and insert therefore -- preventing the stopper --; and Column 9, line 21, please delete "on any sides" and insert therefore -- on any side --.

Signed and Sealed this

Tenth Day of November, 2009

David J. Kappos
*Director of the United States Patent and Trademark Office*